US006892987B2

(12) United States Patent
Anglin et al.

(10) Patent No.: US 6,892,987 B2
(45) Date of Patent: May 17, 2005

(54) PREDICTING, BOUNDING AND MITIGATING SATELLITE ATTITUDE DISTURBANCES ARISING FROM INFRARED EARTH SENSORS FOR SATELLITES IN INCLINED, ELLIPTICAL ORBITS

(75) Inventors: Patrick T. Anglin, New York, NY (US); Ronald W. Bounds, Princeton, NJ (US); Christopher A. Croom, Brooklyn, NY (US); Paul W. Crawford, North Brunswick, NJ (US); Theodore Hessler, III, Hamburg, NJ (US); Michael Kokkalakis, Brooklyn, NY (US); Claudia H. Lam, Princeton, NJ (US)

(73) Assignee: Sirius Satellite Radio Inc., New York, NY (US)

( * ) Notice: Subject to any disclaimer, the term of this patent is extended or adjusted under 35 U.S.C. 154(b) by 0 days.

(21) Appl. No.: 10/627,534

(22) Filed: Jul. 25, 2003

(65) Prior Publication Data

US 2005/0029405 A1 Feb. 10, 2005

(51) Int. Cl.[7] .................................................. B64G 1/36
(52) U.S. Cl. .................................. 244/171; 244/158 R
(58) Field of Search ............................. 244/171, 158 R, 244/164, 177

(56) References Cited

U.S. PATENT DOCUMENTS

| 4,437,047 A | * | 3/1984 | Smay ........................ 318/649 |
| 4,732,354 A | * | 3/1988 | Lievre ........................ 244/170 |
| 4,848,706 A | * | 7/1989 | Garg et al. ................. 244/169 |
| 5,459,669 A | * | 10/1995 | Adsit et al. ................. 701/226 |
| 5,597,142 A | * | 1/1997 | Leung et al. ............... 244/164 |
| 5,646,723 A | * | 7/1997 | Fallon .................... 356/139.01 |
| 5,655,735 A | * | 8/1997 | Wirthman et al. .......... 244/165 |
| 5,738,309 A | * | 4/1998 | Fowell ....................... 244/171 |
| 6,098,929 A | * | 8/2000 | Falbel ........................ 244/171 |

* cited by examiner

Primary Examiner—Tien Dinh
(74) Attorney, Agent, or Firm—Patrick F. Bright; Bright & Lorig, P.C.

(57) ABSTRACT

Satellite earth sensors (ES) generate scan lines, areas of detected infrared information gathered across the view of the earth by the satellite. The length of these scan lines is utilized by the satellite Attitude Control Subsystem (ACS) to determine the satellite pointing in roll and pitch. There are areas on the earth during particular periods of the year that can cause earth radiance gradient disturbance effects, satellite attitude errors caused by the ACS-calculated length of the scan lines becoming faulted. This invention includes methods and systems for minimizing disturbances to the satellite attitude for satellites in inclined, elliptical orbits that use infrared earth sensors to determine pitch and roll angles. These include identifying areas where earth radiance gradient events cause such disturbances and the prediction of times of such occurrences and methods for mitigating the effect of such events.

7 Claims, 6 Drawing Sheets

PREDICTING, BOUNDING AND MITIGATING SATELLITE ATTITUDE DISTURBANCES ARISING FROM INFRARED EARTH SENSORS FOR SATELLITES IN INCLINED, ELLIPTICAL ORBITS

BACKGROUND OF THE INVENTION

This invention relates to earth satellites that operate in inclined, elliptical orbits and that use infrared earth sensors (ES) for satellite roll and pitch attitude reference determinations. These sensors utilize a plurality of scan lines, which are areas of the earth viewed by a satellite from which the sensor detects infrared radiation from the earth (see FIG. 1). The length of these scan lines over the earth view is utilized by the satellite Attitude Control Subsystem (ACS) to determine the position of the satellite. The infrared data from the scan lines sometimes experience undesirable disturbances, arising from a rapid change in the measured infrared radiation as the ES scan lines traverse certain regions on the earth such as, for example, polar regions, particularly during polar winter. These disturbances, referred to as earth radiance disturbance events (ERGD's), alter the magnitude of the scan lines inputted to the satellite's ACS, causing satellite pointing errors in the pitch and roll axes. Such errors may lead to strain on satellite operations, or even loss of satellite/earth contact. The systems and methods of this invention determine, predict the geographical boundaries and time periods where and when ERGD's occur, and mitigate or avoid such ERGD's.

This invention relates, in part, to satellite systems disclosed in the following patents and patent publications:

| U.S. Pat. No. | Title | Issue Date |
| --- | --- | --- |
| 6,564,053 | Efficient High Latitude Service Area Satellite Mobile Broadcasting Systems | May 13, 2003 |
| 6,023,616 | Satellite Broadcast Receiver System | Feb. 8, 2000 |
| 5,864,579 | Digital Radio Satellite And Terrestrial Ubiquitous Broadcasting System Using Spread Spectrum Modulation | Jan. 26, 1999 |
| 5,794,138 | Satellite Broadcast System Receiver | Aug. 11, 1998 |
| 5,592,471 | Mobile Radio Receivers Using Time Diversity To Avoid Service Outages In Multichannel Broadcast Transmission Systems | Jan. 7, 1997 |
| 5,485,485 | Radio Frequency Broadcasting Systems And Methods Using Two Low-Cost Geosynchronus Satellites And Hemispherical Coverage Antennas | Jan. 16, 1996 |
| 5,319,673 | Radio Frequency Broadcasting Systems And Methods Using Two Low-Cost Geosynchronus Satellites | Jun. 7, 1994 |
| EPO Patent | Title | Date Of Pub. |
| EP 0 959 573 A2 | System For Efficiently Broadcasting Via Satellite To Mobile Receivers In Service Areas At High Latitude | Nov. 24, 1999 |
| EP 990303823 | | |
| Int'l. Pub. No. | Title | Intl. Pub. Date |
| WO 01/33729 A1 | Method And System For Providing Geographic Specific Services In A Satellite Communications Network | May 10, 2001 |
| WO 01/33720 A3 | Method And Apparatus For Selectively Operating Satellites In Tundra Orbits To Reduce Receiver Buffering Requirements For Time Diversity Signals | May 10, 2001 |

Each of these patents and patent publications is incorporated herein by reference as though fully set forth here.

SUMMARY OF THE INVENTION

The methods and systems of this invention analyze the geometry of ES scan lines to determine the boundaries on the earth for the locations and time periods of ERGD events. Two parameters that together describe the geometry and orientation of ES scan lines, are a satellite's argument of latitude (Arg Lat) and yaw reference (Ref Yaw) angle. Each Arg Lat value is associated with a distinct satellite ground track location[1] (see FIG. 6), which uniquely describes where the satellite is positioned with respect to the earth surface. The Ref Yaw angle indicates the yaw rotation of the satellite and the ES scan lines, for fixed ES's, relative to earth's north pole (e.g., zero degree Ref Yaw has the x-axis of the satellite perpendicular, and the y-axis of the satellite parallel, to the earth's north pole, respectively). The methods and systems of this invention analyze the Arg Lat and Yaw Ref angle values arising during ERGD events, and obtain data points associated with ES scan line geometries that provide the boundary conditions of ERGD events, then mitigate or avoid such events.

[1]The plot on the earth's surface generated by tracing the intersection of the imaginary line between the satellite and the center of the earth over an orbit period.

In other embodiments, mathematical models could be used to determine these ERGD regions without the use of empirical data.

Mitigating methods are, in preferred embodiments, one of the following: yaw biasing of the satellite, ES scan inhibits of at least one of the plurality of ES scans, and use of the DIRA (digital integrating rate assembly) which uses gyroscopes for attitude reference. Yaw biasing rotates ES scan lines during ERGD periods, so that these scan lines do not cross ERGD event areas on the earth's surface during these periods (see FIG. 1). Inhibiting one of the ES scans while a satellite passes over an ERGD region during potential ERGD events avoids inputting noisy ES infrared data into the attitude control subsystem so there are no disturbances to the satellite's pitch and roll attitude in such a region. Utilizing the DIRA gyroscopes for attitude reference during the periods when ERGD events occur enables the satellite ACS to ignore the ES data, thereby removing all effects of the ERGD events from the satellite attitude.

BRIEF DESCRIPTION OF THE DRAWINGS

This invention can better be understood by reference to the drawings in which.

DESCRIPTION OF THE PREFERRED EMBODIMENTS

In preferred embodiments, satellites with two ES's provide four ES scans (two for each ES) over the field of view (FOV) of the earth, detecting the heat emitted from the earth by measuring the infrared emission. The length of the scan lines over the earth view is used to determine the pointing of the satellite in roll and pitch in relation to the center of the earth. ES's are preferably in a fixed location on a satellite. The Z-axis extends from the center of the satellite to the center of the earth. Rotation of the satellite about the Z-axis is referred to as yaw. Therefore, since the ES's are fixed on the satellite structure, the ES scans rotate around the earth's FOV as the satellite rotates in yaw. This measure of the satellite yaw, coupled with the Arg Lat, gives the rotation of the ES scan lines and the point on the earth view about which the scan lines are rotated, respectively. From an analysis of past ERGD events, distinct values of Arg Lat and Ref Yaw where ERGD events occur can be established. Therefore, ERGD's are related to ES scan locations. These empirically-identified regions of ERGD's serve to predict the spatial boundaries and time periods of future ERGD events, allowing preventive measures to be implemented before a satellite crosses an entrance boundary to an ERGD area, then to be discontinued as the satellite passes over the exit boundary of that area.

Yaw Biasing

In preferred embodiments, yaw biasing, the implementation of additional rotation about yaw, changes the area of the earth FOV that ES scan lines cross, avoiding the ERGD regions. Yawing of the satellite is accomplished, in preferred embodiments, through a change in the reaction wheels' momentum as commanded via the ADCS (Attitude Determination and Control Subsystem). Other actuators that may be available on different satellites could be used to accomplish the desired rotation in yaw. The magnitude of yaw biasing required to avoid ERGD regions depends in part on satellite paths/orbits represented by Arg Lat and Ref Yaw. In one embodiment, a 15 degree maximum absolute value yaw bias employed for four weeks avoided ERGD events during that satellite's ERGD season. Some embodiments use fixed yaw bias throughout an ERGD location and period. Preferably, however, yaw biasing is implemented each day in response to potential ERGD events, based on the predicted boundaries for ERGD events. This approach minimizes the total duration of the yaw biasing, thereby reducing the duration of decreased solar array power from yaw biasing ERGD mitigation. Yaw biasing tends to reduce solar array output power because the satellite's solar arrays are not perpendicular to the sun during these periods.

Figure 1:
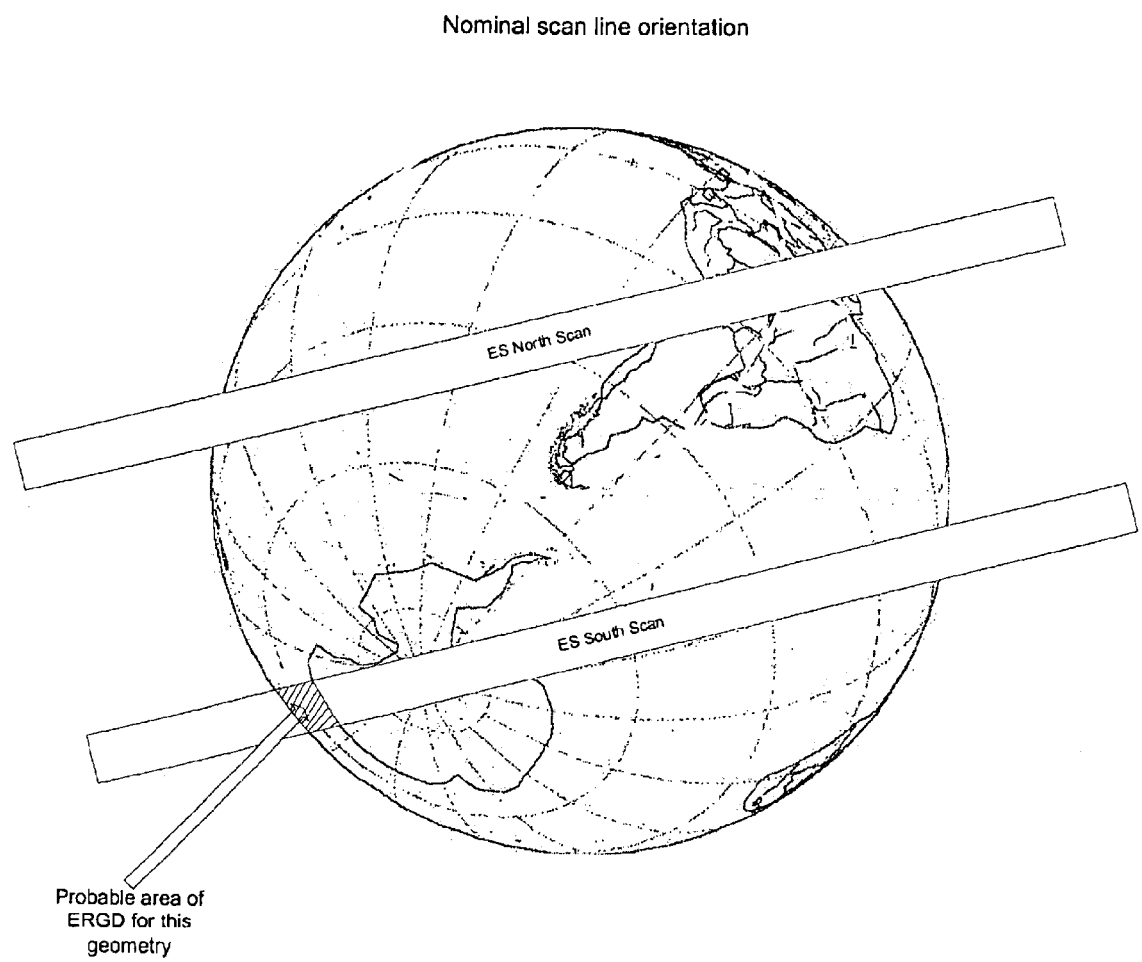
FIG. 1 shows, schematically, the north and south scan lines for an earth sensor (ES) on a satellite in an inclined, elliptical earth orbit with an area scanned causing ERGD effects.
Figure 2:
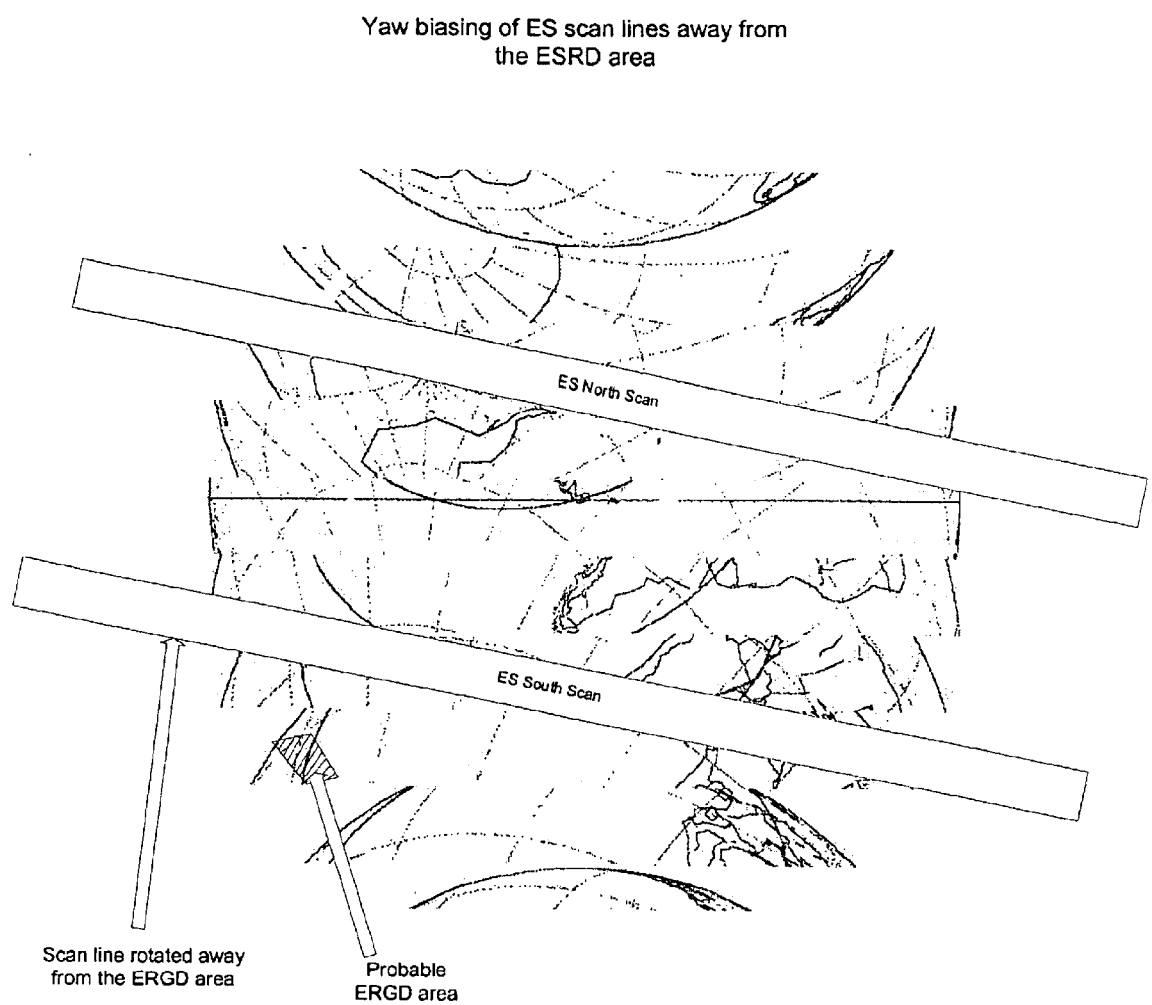
FIG. 2 shows the re-positioning of ES scan lines for the satellite depicted in FIG. 1 after satellite yaw biasing to mitigate ERGD effects.

FIG. 1 shows two scans, the ES north scan, and the ES south scan, for an infrared earth sensor mounted on a satellite that operates in an inclined, elliptical orbit over the earth. In FIG. 1, the ES south scan is exposed to an ERGD area as the satellite scan passes over a portion of Antarctica, resulting in undesirable attitude disturbances of the satellite. FIG. 2 shows the same sensors' scan lines after mitigation of ERGD effects by yaw biasing the satellite. In FIG. 2, the south ES scan is biased away from the region of the earth causing ERGD events. The satellite remains in this biased orientation until the predetermined boundary exit has been crossed, at which point the satellite returns to its nominal yaw angle.

Scan Inhibit

The same ERGD spatial boundaries/time periods can also be used for determining the timing of scan inhibit mitigation. However, since scan inhibits involve one or more but not all of the sensor's scan line(s), additional analysis as to which scan line(s) to inhibit is required. It is well understood how a satellite's attitude control system reacts, as seen in the ES roll and pitch data, to a particular scan line displaying ERGD effects. For scan inhibit ERGD mitigation operation, empirical data of the ES roll and pitch polarity from past ERGD events are used to determine, for a particular spatial boundary, which scan line(s) to inhibit. Once the satellite enters the boundary of an ERGD area, the appropriate scan line(s) is inhibited, removing its data from entering the satellite's attitude control loop. Once the satellite passes the exit to that boundary area, the satellite returns to its nominal operational status with all of the scan lines providing roll and pitch attitude reference for the satellite's ADCS. This technique can only be implemented for a limited time since the ADCS can only compensate for the roll errors resulting from the scan inhibit up to a certain magnitude after which the errors are processed by the attitude control as actual errors in pointing, causing inaccurate satellite orientation.

Referring again to FIG. 1, the satellite whose ES scan is passing over Antarctica, where ERGD events sometimes occur, can avoid undesirable satellite attitude disturbances by inhibiting the south ES scan, and relying solely on the north ES scan for attitude reference, until the satellite's scan lines exit this ERGD region over Antarctica.

DIRA Operation

The DIRA uses gyroscopes to measure satellite movement in inertial space. This movement information is processed by the ADCS and can be used instead of ES data in ERGD areas. Using the DIRA for attitude reference to mitigate an ERGD event is preferably initiated before crossing the entrance boundary of an ERGD area. This minimizes the use of the DIRA's limited life and provides safer satellite operation than real-time reactions to ERGD's. At the exit boundary, the satellite reverts to the ES's data for roll and pitch attitude reference. Thus, a satellite exposed to ERGD effects resulting from its ES scan passing over Antarctica, see FIG. 1, can mitigate those effects by ignoring the data from the north and south ES scans, and instead relying on the DIRA's for attitude reference while the satellite's scan passes over an Antarctic ERGD region.

Figure 3:
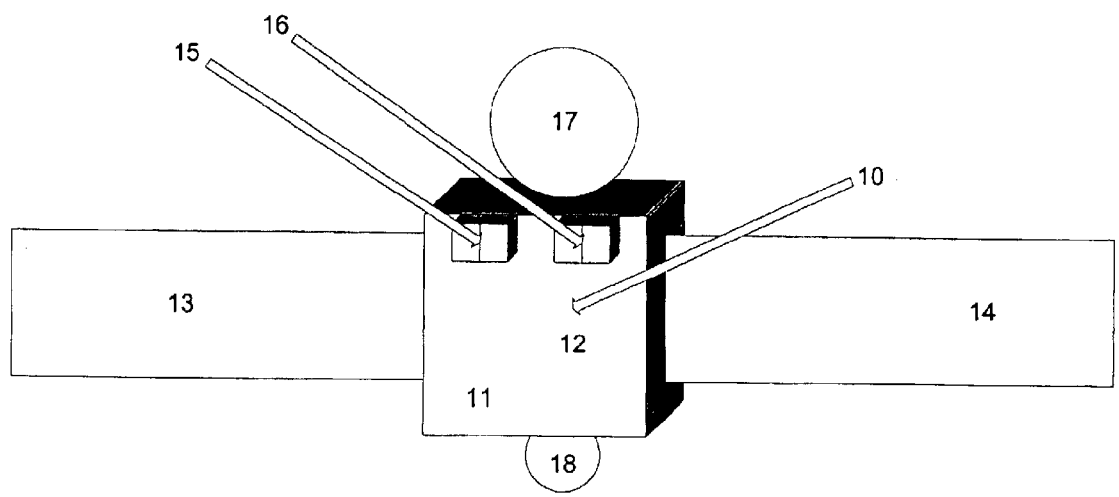
FIG. 3 shows a schematic representation of a typical satellite including infrared earth sensors.

FIG. 3 shows schematically a typical satellite with infrared earth sensors 10. Satellite 10 includes the satellite structure 11, an earth-directed face 12, downlink antenna 17, and uplink antenna 18. Satellite 10 also includes solar power panels 13 and 14, and infrared earth sensors 15 and 16. Sensors 15 and 16 provide infrared data that is used to determine satellite roll and pitch, and are linked to means for yaw biasing sensors' 15 and 16 scan lines away from ERGD areas on the earth as satellite system 10 earth scan(s) passes over such areas. Alternatively, sensors 15 and 16 may be linked to means for inhibiting at least one of the sensors' 15 and 16 scans while the satellite's earth scan(s) passes over an area of the earth where ERGD events take place.

Figure 4:
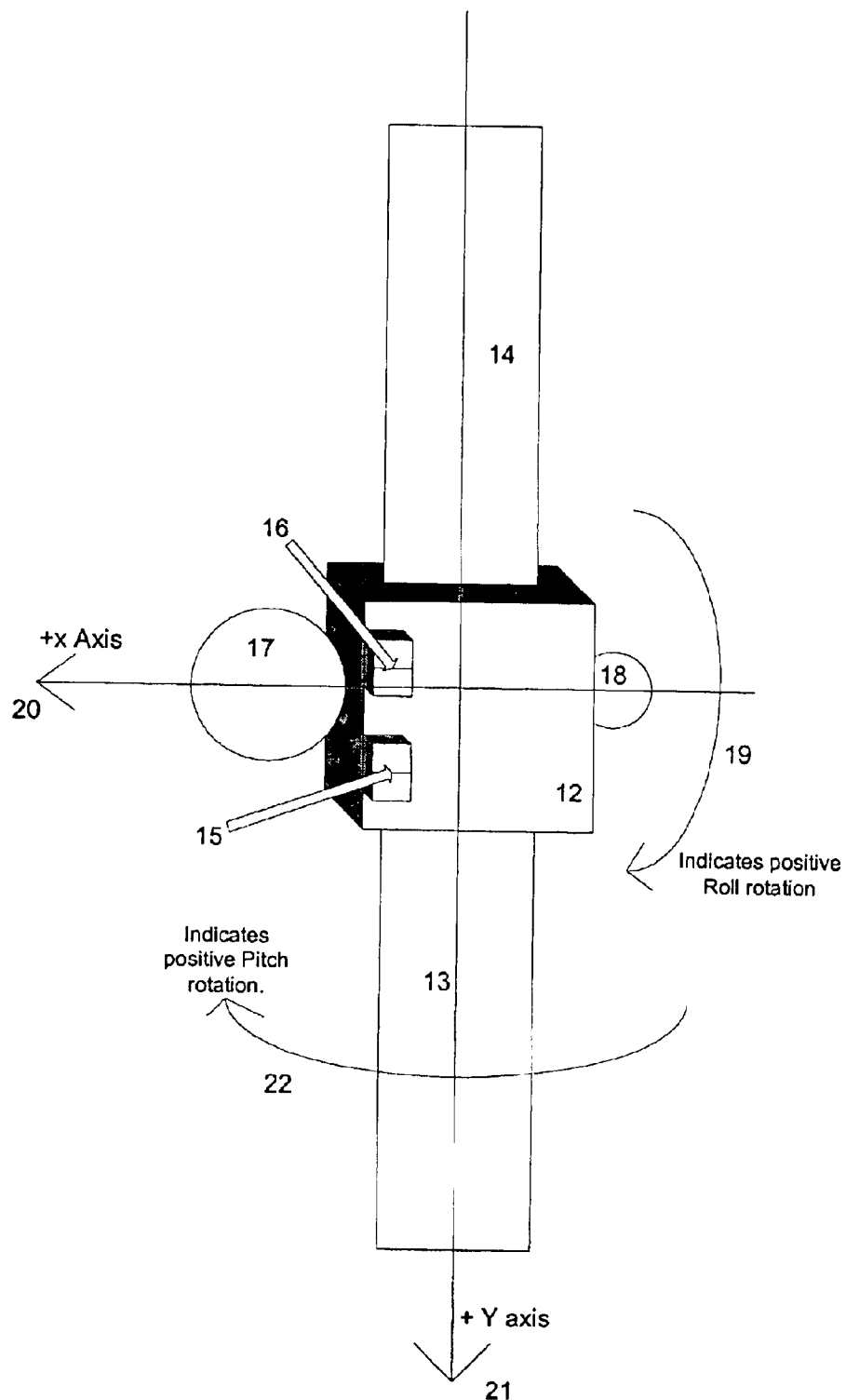
FIG. 4 shows, in the satellite of FIG. 3, the direction of positive roll rotation along the x-axis of the satellite, and the direction of positive pitch rotation along the y-axis of the satellite.

FIG. 4 shows, in satellite 10, the direction of positive pitch rotation of the satellite along path 22 about y-axis 21, and the direction of positive roll rotation of the satellite along path 19 about x-axis 20.

Figure 5:
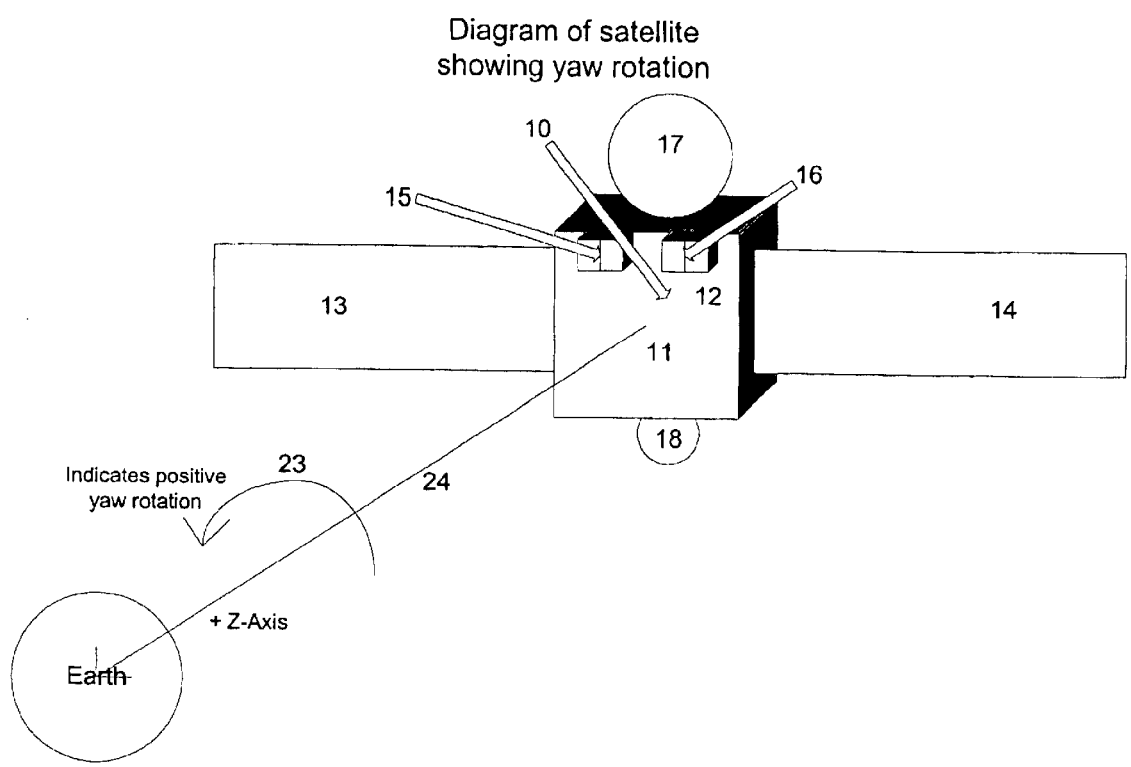
FIG. 5 shows, in the satellite of FIG. 3, the direction of positive yaw rotation along the z-axis of the satellite with respect to the earth
Figure 6:
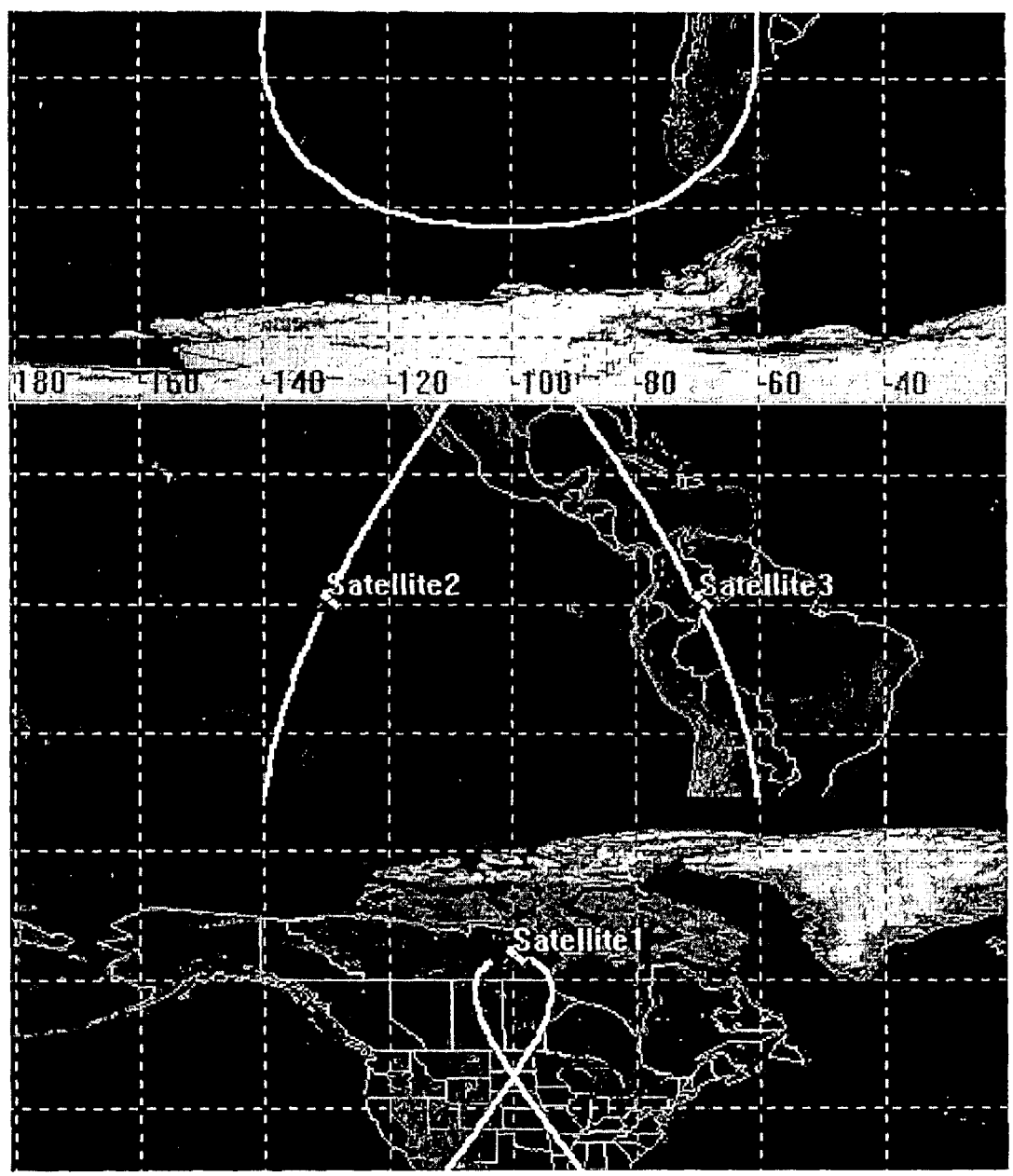
FIG. 6 shows an example of a satellite ground track for an inclined, elliptical satellite orbit.

FIG. 5 shows, in satellite 10, the direction of positive yaw rotation of the satellite along path 23 about z-axis 24 with respect to the earth.

What is claimed is:

1. A system for mitigating ERGD events affecting the pitch and roll attitude of a satellite in an inclined, elliptical earth orbit which comprises a plurality of infrared earth sensors for determining satellite roll and pitch connected to means for yaw biasing said infrared earth sensors's earth scans away from ERGD areas on the earth.

2. A system for mitigating ERGD events affecting the pitch and roll of a satellite in an inclined, elliptical earth orbit which comprises a plurality of infrared earth sensors for determining satellite roll and pitch connected to means for inhibiting at least one of said infrared earth sensors' scans while said scan passes over ERGD areas on the earth.

3. A system for mitigating ERGD events affecting the pitch and roll of a satellite in an inclined, elliptical earth orbit which comprises a plurality of infrared earth sensors for determining satellite roll and pitch connected to means for using digital integrating rate assembly (DIRA) instead of said earth sensors for satellite roll and pitch determination while said scan passes over such areas.

4. A method for mitigating disturbances in roll and pitch of an earth satellite in an inclined, elliptical orbit, said disturbances arising from ERGD events in earth areas that the satellite's ES scan traverses, said satellite including infrared earth sensors for satellite roll and pitch attitude control, comprising determining where said areas are located, and mitigating the effect of said ERGD events in said areas.

5. The method of claim 4 further comprising mitigating said disturbances by yaw biasing said satellite and its ES sensors to avoid exposure of said ES sensors to said ERGO areas.

6. The method of claim 4 further comprising mitigating said ERGO disturbances by inhibiting at least one scan of said ES sensors while said satellite's ES scan traverses said areas.

7. The method of claim 4 further comprising mitigating said ERGD disturbances by ignoring ES data while said satellites scan passes over said areas, and using DIRA's for pitch and roll positioning during said passage over said areas.

* * * * *